United States Patent
Kalanja (12) 
(10) Patent No.: US 10,689,115 B2
(45) Date of Patent: Jun. 23, 2020

(54) AIR DELIVERY LOCK FOR A CARGO LOCATED IN AN AIRCRAFT AND A RESTRAINT SYSTEM

(71) Applicant: AIRBUS DEFENCE AND SPACE GMBH, Taufkirchen (DE)

(72) Inventor: Mario Kalanja, Munich (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 225 days.

(21) Appl. No.: 15/914,901

(22) Filed: Mar. 7, 2018

(65) Prior Publication Data

US 2019/0055020 A1 Feb. 21, 2019

Related U.S. Application Data

(60) Provisional application No. 62/476,379, filed on Mar. 24, 2017.

(51) Int. Cl.
*B64D 9/00* (2006.01)
*F16H 37/12* (2006.01)
*B64D 1/10* (2006.01)

(52) U.S. Cl.
CPC ............ *B64D 9/003* (2013.01); *F16H 37/12* (2013.01); *B64D 1/10* (2013.01)

(58) Field of Classification Search
CPC . B64D 9/003; B64D 1/02; B64D 1/08; B64D 1/10; B64D 1/12; B64D 9/00; F16H 37/12
USPC ................ 244/137.1, 137.3, 151 B
See application file for complete search history.

(56) References Cited

U.S. PATENT DOCUMENTS

| | | | | |
|---|---|---|---|---|
| 4,349,168 A | * | 9/1982 | Barnes .................. | B64D 9/003 244/137.3 |
| 4,379,535 A | * | 4/1983 | Baldwin ................ | B64D 9/003 244/137.3 |
| 4,395,172 A | * | 7/1983 | Hoener .................. | B64D 9/003 244/118.1 |
| 4,401,286 A | * | 8/1983 | Naffa .................... | B64D 9/003 244/118.1 |

(Continued)

FOREIGN PATENT DOCUMENTS

EP 0771726 A2 * 5/1997 ............ B64D 9/003
EP 3061690 A1 * 8/2016 ........... B64D 9/0003

(Continued)

*Primary Examiner* — Hilary L Gutman
(74) *Attorney, Agent, or Firm* — Jenkins, Wilson, Taylor & Hunt, P.A.

(57) ABSTRACT

An air delivery lock for a cargo located in an aircraft includes a housing, a restraining device having an engagement end for contacting and restraining the cargo, and a force reaction end, a bell crank having a bell crank joint for swivably mounting the bell crank, an elastically deformable force introduction unit, and a latching unit. The restraining device is swivably mounted on a leg of the bell crank around a restraining device axis. The force introduction unit is attached to a second leg of the bell crank and the force reaction end of the restraining device. A first guide attached to the housing and a second guide attached to the restraining device prevent rotation of the bell crank until a predetermined release force is reached on the engagement end of the restraining device.

13 Claims, 8 Drawing Sheets

(56) References Cited

U.S. PATENT DOCUMENTS

| | | | | |
|---|---|---|---|---|
| 4,461,437 A * | 7/1984 | Ashley, Sr. | ............ | B64D 9/003 |
| | | | | 244/137.3 |
| 9,085,364 B2 * | 7/2015 | Huber | ........................ | B60P 7/13 |
| 2017/0197717 A1 * | 7/2017 | Trisotto | ................... | B64D 1/10 |

FOREIGN PATENT DOCUMENTS

| | | | | | |
|---|---|---|---|---|---|
| EP | | 3378769 A1 * | 9/2018 | ............. | F16H 37/12 |
| WO | WO-2009094978 A1 * | | 8/2009 | ............... | B64D 1/08 |

* cited by examiner

AIR DELIVERY LOCK FOR A CARGO LOCATED IN AN AIRCRAFT AND A RESTRAINT SYSTEM

CROSS-REFERENCE TO RELATED APPLICATION

This application claims the benefit of U.S. provisional patent application No. 62/476,379, filed Mar. 24, 2017

TECHNICAL FIELD

The invention relates to an air delivery lock for a cargo located in an aircraft, in particular for locking pallets located in the aircraft, allowing to deliver them by parachute, gravity drop or combat offloading. The invention further relates to a restraint system having a plurality of air delivery locks as well as an aircraft having such a restraint system.

BACKGROUND

It is known for many decades to deploy loads out of an aircraft by means of an aerial delivery parachute in military operations and disaster relief situations. Basically, there are three different methods for delivering the loads. In one method a parachute may be deployed into the surrounding airflow of the aircraft, which parachute is attached to the load to be delivered. Hence, a traction force acts on the load, which is held by air delivery locks in place. When reaching a predetermined traction force, the air delivery locks are released and the cargo is pulled out of the aircraft by means of the parachute. Another common method for deploying cargo from an aircraft is conducted by increasing the angle of attack of the aircraft, such that the cargo load is dropped out gravity-driven. In doing so, the parachute will be deployed after the drop. A third method is known as combat offloading. Here, the aircraft is flying at a very low altitude above the cargo deployment area or it may even touch down in the fashion of a touch and go landing. Subsequently the aircraft accelerates, and the cargo is deployed by the inertia loads due to the acceleration. With this method no drop parachute is used, but a small extraction parachute may be an option.

The air delivery locks used for holding the cargo in place are commonly automatic locks. The locks are responsible for restraining the cargo in an X-direction, i.e. in a forward/rearward direction, and are mounted to guiding rails that restrict the pallet movement in a Z-direction, i.e. vertical, as well as in an Y-direction, i.e. lateral. The guide rails and the delivery locks are located underneath a cargo floor and can be folded up. The cargo pallet to be deployed rests against the restraining device and exerts a certain force onto the restraining device through a mechanical link including a spring. Upon reaching a predetermined pressing force of the cargo pallet, the pallets are released. Hence, when a deployment parachute pulls the cargo, it is automatically released once a predetermined force is reached or exceeded.

BRIEF SUMMARY

Common air delivery locks as described above are subject to elasticity and play issues, which may lead to a reduced precision regarding the required traction force after a plurality of uses. Still further, the cargo pallet that is dragged over the air delivery locks may experience the creation of longitudinal recesses or channels during the deployment motion. When reusing the cargo pallet, such a recess may lead to a more imprecise contact between the cargo pallet and the air delivery lock.

Hence, it is an object of the invention to propose an air delivery lock for a cargo located in an aircraft with improved reliability and less vulnerability to wearing out.

This object is met by an air delivery lock having the features of the independent claim 1. Advantageous embodiments and further improvements may be gathered from the sub-claims and the following description.

An air delivery lock for a cargo located in an aircraft is proposed, the lock comprising a housing, a restraining device having an engagement end for contacting and restraining the cargo, and a force reaction end; a bell crank having a bell crank joint for swivably mounting the bell crank; and an elastically deformable force introduction unit; and a latching unit. The restraining device is swivably mounted on a first leg of the bell crank around a restraining device axis. The force introduction unit is attached to a second leg of the bell crank and the force reaction end of the restraining device. Furthermore, the latching unit comprises a first guide means and a second guide means. The first guide means is attached to a structurally fixed point of the housing and the second guide means is attached to the restraining device. The first guide means, the second guide means, the restraining device, the bell crank and the force introduction unit are designed that the first guide means allows a rotation of the restraining device around the restraining device axis, thereby deforming the force introduction unit, and prevents a rotation of the bell crank by limiting the motion of the second guide means, if the force acting on the engagement end is below a predetermined release force, and that the first guide means releases the second guide means if the force acting on the engagement end equals or exceeds the predetermined release force, thereby allowing the bell crank to rotate.

In the following, the main components defined above are briefly explained.

The housing is an enclosure or receptacle, in which all components of the lock are mounted. The housing is arrangeable on, under or in the cargo compartment floor, such that it can interact with the cargo, such as cargo pallets, to be deployed. The housing preferably is sufficiently rigid to absorb and transfer the loads occurring during the cargo deployment.

The restraining device is considered a kind of lever (detent lever) or bar that is designed for providing a surface contact with the cargo to be deployed. In the context of the above description, the restraining device has an engagement end (detent head) that protrudes from the cargo floor, on which the cargo to be deployed is placed. Hereby, the restraining device can penetrate an upper surface of the housing. The remaining part of the restraining device extends further below and preferably always remains inside the housing. The force reaction end, which is located inside the housing, is the end opposite the engagement end. By preferably having a surface contact with the cargo, the restraining device restrains the cargo as long as a sufficient force acts on the force reaction end for a compensation. As becomes apparent, the restraining action ends in certain states of the cargo or the lock.

The bell crank is swivably mounted by means of the bell crank joint and may exemplarily comprise two legs, i.e. the first leg and the second leg. Both legs may constitute an L-shaped part with the two legs enclosing an angle of substantially or largely 90°. At the intersection of both legs, the bell crank joint may be located. The housing may comprise a suitable receiving means or support at a suitable location to hold the bell crank joint in a swivable manner.

The restraining device is swivably mounted on the first leg around a restraining device axis, such that the engagement end may be moved back and forth along a deployment direction. Through this swivable mounting, the force reaction end moves in an opposite direction to the engagement end. Hence, the restraining device has the function of a rocker.

Between the force reaction end and the second leg of the bell crank, the elastically deformable force introduction unit is placed, which may be compressed through the motion of the force reaction end. For example, the force introduction unit is realized as a compression spring, which exerts a force depending on its level of compression. If a cargo pallet presses against the engagement end of the restraining device in the deployment direction, the force reaction end of the restraining device is moved in an opposite direction and compresses the force introduction unit, leading to a certain force introduced by the force introduction unit into the force reaction end. Altogether, the restraining device rotates with the force received on the engagement end until the moment about the restraining device axis is equalized. This depends on the actual design of the restraining device and the location of the restraining device axis.

For avoiding a motion of the bell crank in force range below the predetermined deployment force, a latching unit is present. Here, a first guide means and a second guide means are provided, which conform each other. Goal of this combination of two guide means is to selectively release the second guide means, once a predetermined level of rotation of the restraining device is conducted, which in turn is a measure of the force exerted on the engagement end. For this purpose, the first guide means is arranged at a fixed location in the housing and the second guide means is fixedly attached to the restraining device. Depending on the actual design of the first and second guide means as well as other boundary conditions the second guide means may exit the or be released from the first guide means after a certain angle of rotation is experienced.

If the movability of the second guide means is not limited by the first guide means any more, the force introduction unit urges into an unloaded state and thereby the restraining device is rotated back into a neutral position. This requires the bell crank to rotate around the bell crank axis, since the engagement end of the restraining device still faces a force from the cargo.

Hence, the provision of the first and second guide means allow to clearly improve the reliability of the lock to open at or above a predetermined force. Wear effects and slight damages/deformations to lock components and cargo pallets have a clearly reduced effect compared to common air delivery locks.

It is feasible if the first leg of the bell crank is arranged largely parallel to the deployment direction in a neutral state of the lock. Hence, a rotation of the bell crank leads to a largely vertical movement of the restraining device after reaching the predetermined deployment force. Consequently, the engagement end reliably moves away from the cargo.

Advantageously, the lock further comprises an upper stop arranged above the first leg of the bell crank for limiting a vertical movability of the first leg of the bell crank in an upwards direction. Preferably, the vertical position of the mechanical stop is adjustable, in order to adjust the play of the restraining device relative to the cargo, i.e. to the cargo floor and/or rails attached to the cargo floor.

Further, the lock may further comprise an end stop arranged on the bell crank and engageable by the restraining device in order to limiter a rotation of the restraining device around the restraining device axis in a direction to the bell crank joint, i.e. against the deployment direction.

In a still further advantageous embodiment, the lock further comprises a blocking device, which comprises a blocking element and an actuator, wherein the blocking device is adapted to selectively move the blocking element either against a part of or fixedly attached to the restraining device in order to prevent its rotation or to a distance thereto in order to let it freely rotate. The blocking device therefore allows to selectively block the air delivery lock to fully prevent a cargo deployment. If a deployment is desired, the blocking element should be moved to a distance from the restraining device so as to allow the lock to automatically open once the predetermined load is reached or exceeded. If the blocking element is moved against a part of or fixedly attached to the restraining device, the air delivery lock is in a logistically locked state. In this state, the cargo remains immovable.

An advantageous embodiment further comprises a contacting head swivably mounted on the engagement end, the contacting head having a contacting surface capable for providing a surface contact with the cargo to be deployed. The contacting head comprises or provides a component that preferably has a flat outer surface that contacts the cargo pallet. This may include a longitudinal, planar, surface-like, flat or otherwise shaped component, which allows to provide a surface contact with a part of the cargo pallet. It is conceivable that the contacting head comprises two opposed edges, between which the contact surface is located. One of the edges comprises a hinge or a joint, coupled with the restraining device. The hinge or joint comprises a rotation axis, which is referred to as contacting head axis in the following. Advantageously, the contacting head joint comprises a tight clearance fit to substantially avoid rattling and a resulting wear. Preferably, the contacting head is designed so as to be parallel to a forward edge of the cargo pallet at least in an unloaded state. Besides the reduction of wear of the cargo pallet as well as the engagement end of the restraining device also a harmonic and precise force introduction is achieved. In order to allow the contacting head to provide and maintain a surface contact to the cargo pallet independent from the orientation of the restraining device, the contacting head axis should be parallel to the restraining device axis.

Advantageously, the contacting head is swivably mounted by means of a spherical joint, which allows a movement around at least two rotational axes. In case it is not possible to provide or maintain a contacting head axis that is parallel to the restraining device axis the spherical axis the spherical joint is able to compensate a more or less slight angular alignment of both axes. It may be feasible to limit the rotatability of the spherical joint through end stops or other components.

In an advantageous embodiment, the first guide means is a cam device and the second guide means is a pin, wherein the first guide means has an outer cam surface facing to the bell crank joint, wherein the first guide device has a first guide surface having a first mean slope and a second guide surface having a second mean slope, the first guide surface and the second guide surface being connected to each other, and wherein the first guide means and the second guide means are designed that the pin slides on the first guide surface, thereby deforming the force introduction unit, and prevents the rotation of the bell crank, if the force acting on the engagement end is below the predetermined release force, and that the pin slides on the second guide surface, thereby allowing the bell crank to rotate about the bell crank axis, if the force acting on the engagement end equals or exceeds the predetermined release force.

If the restraining device is moved under the action of a force from the cargo, the pin attached to the force reaction end consequently also moves. The cam is placed in the housing directly underneath the pin, such that the pin rests on the first guide surface of the cam in a neutral state, i.e. when a force of the cargo pallet is not introduced to the engagement end. If the engagement end receives a force, it slightly moves depending on the received force and, consequently, the pin slides on the first guide surface. The first guide surface is designed in such a manner that for all forces below a predetermined release force, the pin is guided to simply allow the rotation of the restraining device around the restraining device axis, while the bell crank remains at a neutral position. Resultantly, only the force introduction device is being compressed and the restraining device is being rotated.

The second guide surface of the cam device that connects to the first guiding surface may only be reached with a certain compression level of the force introduction device, i.e. with a certain force received by the engagement end. Once a predetermined force is about to be reached, the pin is placed on a junction between the first and the second guiding surfaces. The pin will immediately run onto the second guiding surface if the force acting on the engagement end is slightly increased. Here, the second mean slope is designed to allow an additional rotation of the bell crank around the bell crank axis due to the compression device urging into an uncompressed state. In doing so, the engagement end of the restraining device follows the motion of the force introduction element that reverts into the uncompressed state while sliding on the second guiding surface in a direction away from the upper side of the housing, i.e. away from the cabin floor. Consequently, the restraining device moves below the cargo, such that the surface contact with the cargo pallet is lost and the cargo pallet is released.

The position of the cam device may be selectively adjustable along the deployment direction such that the pin is situated above the second guide surface. With this displacement, the cam device substantially does not counteract the rotation of the bell crank, as the pin immediately moves along the second guide surface if the restraining end faces a force. This operating state allows a gravity drop/combat offloading, in which the cargo is deployed exclusively driven by gravity forces during a dedicated climb of the aircraft. The cam device may be coupled with an actuator, which moves the cam device along a preferably straight line parallel to the deployment direction within the housing. Additionally, or as an alternative, the cam device may be supported on a linear guide, along which it is movable.

In another embodiment of the invention, the first guide means is a slotted gate device having a circular receiving space surrounded by at least one wall, the wall having an exit slot, wherein the second guide means is a nose piece having a width adapted to the slot of the first guide means, wherein the first guide means and the second guide means are arranged concentrically to the restraining device axis and wherein the first guide means and the second guide means are designed that the second guide means exits the first guide means through the slot if the force acting on the engagement end of the restraining device reaches or exceeds the predetermined release force. Hence, the first and second guide means are not arranged at the force reaction end, but directly at the restraining device axis. The restraining device joint and, thus, the first leg of the bell crank is held in place by the at least one wall, which encloses the circular receiving space, in which the nose piece as the second guide means is arranged. A force action on the restraining device leads to a rotation of the restraining device and the nose piece that is attached to it. If the force acting on the engagement end matches the predetermined force, the nose piece and the exit slot are aligned, such that the nose piece leaves the receiving space through the exit slot. Consequently, the restraining device is released, the force introduction device expands again and the bell crank rotates to lower the engagement end of the restraining device.

In an advantageous embodiment, the first guide means is crescent-shaped and the exit slot is symmetrically arranged in the first guide means. Through the crescent shape the nose piece is guided towards the exit slot, comparable to a hopper or funnel. Hence, the reliability of releasing the restraining device is very high. At the same time, the precision for releasing the lock at a certain predetermined force is also high, since the exit slot requires a very discrete and precise angular position of the restraining device before the nose piece reaches through the exit slot.

In a still further advantageous embodiment, the first guide means is adjustable in its rotational position through a self-locking gear arrangement. The rotational position of the first guide means determines the angular position of the restraining device, at which the nose piece leaves the receiving space. Hence, adjusting the rotational position of the first guide means adapts the predetermined force exactly.

The invention further relates to an air delivery system, comprising at least a pair of parallel guide rails for carrying cargo pallets, which guide rails are extendable along a longitudinal axis of an aircraft, and at least one air delivery lock according to the above in at least one of the rails.

Advantageously, the system may further comprise a control unit couplable with at least one of the actuators, wherein the control unit is adapted for moving the respective actuator according to a desired operation mode. The control unit may be a mechanical and/or electric/electronic control unit.

Here, the operation mode is selected from a group of operation modes, the group comprising: logistically locking, parachute deployment and gravity drop/combat offloading. The control of the respective actuator has been described above.

Lastly, the invention relates to an aircraft having at least one cargo compartment and comprising at least one air delivery system according to the above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
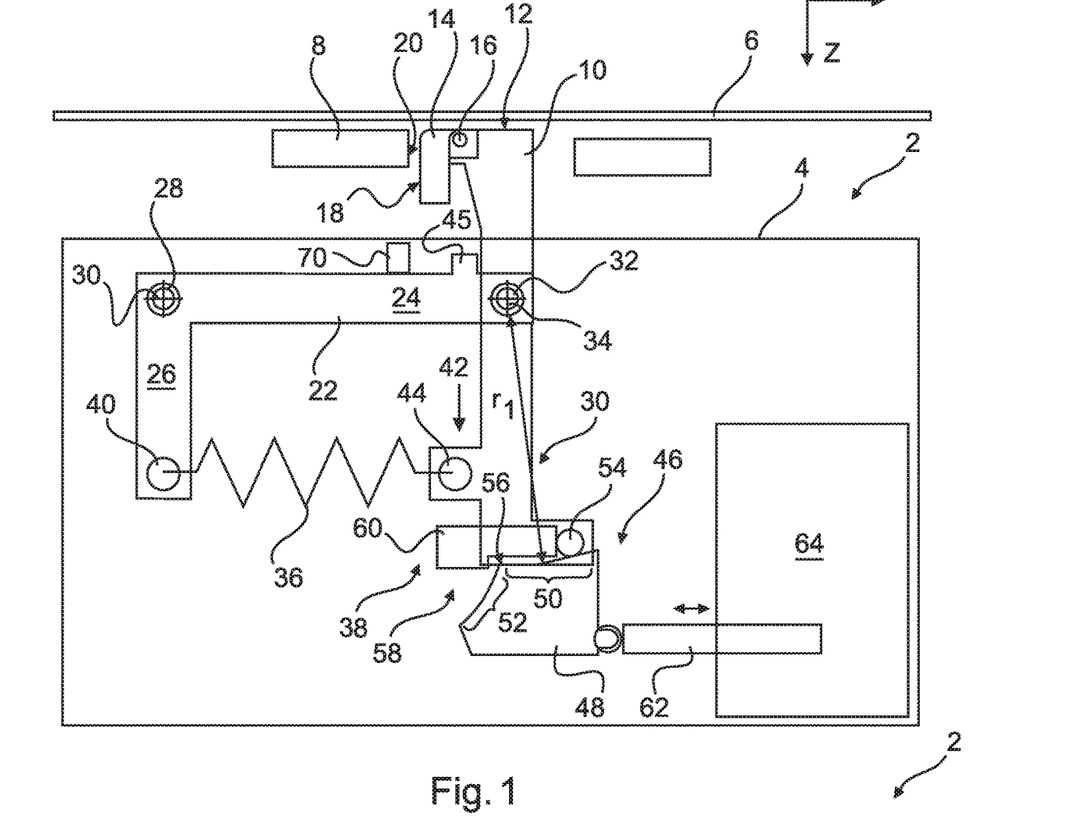
FIG. 1 shows a schematic illustration of the air delivery lock according to a first exemplary embodiment.

FIG. 1 shows a schematic illustration of the air delivery lock according to a first exemplary embodiment. The air delivery lock 2 comprises a housing 4, which may be installed underneath a rail 6, on which cargo pallets 8 are moved. In this illustration, an x-axis is shown, which is parallel to the rails 6 and points into the direction of an open freight door, through which the pallets 8 are deployed outside the aircraft. Above and in the following this x-axis may also be referred to as deployment direction.

The cargo pallet 8 is held by a restraining device 10, which in this case may be a flat component made from a sheet of metal or the like. The restraining device 10 comprises an engagement end 12, which penetrates the housing 4 and sticks out to the rails 6 leaving a small gap between the top of the restraining device 10 and the rail 6. Exemplarily, a contacting head 14 is arranged at the restraining device 10 swivably mounted through a contacting head joint 16. The contacting head 14 comprises a contacting surface 18, which is adapted to flushly contact a forward surface 20 of the cargo pallet 8. By swivably mounting the contacting head 14 the contacting surface 18 may always be parallel to the forward surface 20 unless the pallet 8 is in an extreme up or down position where it is at an upper delimitation or a lower delimitation of the contacting head 14.

Inside the housing 4, a bell crank 22 is placed, which comprises a first leg 24 and a second leg 26, which exemplarily enclose a right angle. In this exemplary embodiment, the first leg 24 is arranged parallel to the x-direction in a neutral state. Hence, the second leg 26 extends downwardly, i.e. in a z-direction. The bell crank 22 is swivably mounted by means of a bell crank joint 28, which lets the bell crank 22 rotate around a bell crank axis 30. The bell crank axis 30 may exemplarily be arranged parallel to the y-axis of the aircraft.

The restraining device 10 is swivably mounted on the first leg 24 of the bell crank 22 by means of a restraining device joint 32, which lets the restraining device 10 rotate around a restraining device axis 34. The restraining device 10 and the bell crank 22 are substantially arranged in the same plane. A force introduction device 36, which is exemplarily realized as a pressure spring, extends between the second leg 26 and a force reaction end 38 of the restraining device 10. Exemplarily, but not necessarily, the second leg 26 has a first force introduction joint 40 at an outer end of the second leg 26. The restraining device 10 in turn has a slight protrusion 42 facing to the second leg 26 and comprises a second force introduction joint 44. The force introduction device 36 extends between the first force introduction joint 40 and the second force introduction joint 44. An end stop 45 arranged on the first leg 24 of the bell crank 22 limits the rotation of the restraining device 10 around the restraining device axis 34 in a counter clockwise direction. This is advantageous in case the load is applied in a negative Z direction, e.g. if the aircraft is encountering a gust.

Still further, a latching unit 46 is present, which comprises a cam 48 as a first guide means having a first guide surface 50 and a second guide surface 52. The first guide surface 50 comprises a first mean slope, which is substantially determined by the distance to the restraining device joint 32 and the restraining device joint axis 34, respectively. The first guide surface 50 is designed to be an arc of a circle having the radius r1, as illustrated in FIG. 1 to be the distance between the restraining device joint axis 34 and the first guide surface.

Hence, when the cargo pallet 8 presses on the engagement end 12 of the restraining device 10, the restraining device 10 rotates about the restraining device joint axis 34 and a pin 54 as a second guide means attached to the force reacting end 38 runs along the first guide surface 50. At the same time, the force introduction device 36 is compressed. The force exerted by the force introduction device 36 therefore rises with the action of the cargo pallet 8.

However, as long as the pin 54 remains on the first guide surface 50, the position of the restraining device axis 34 does not change due to the mean slope of the first guide surface 50. Once the force received by the engagement region 12 reaches or exceeds a predetermined force, the pin 52 reaches a junction 56 and subsequently runs along the second guide surface 52.

The mean slope of the second guide surface 52 clearly differs from the mean slope of the first guide surface 50 and the restraining device 10 must follow the course of the second guide surface 52 and therefore additionally moves in the z-direction. As the force introduction device 36 is relieved, the first leg 24 is pulled downwards and leads to pulling the engagement region 12 below the pallet 8. Then, the pallet 8 is automatically released.

For reliably locking the cargo pallet 8 when it does not have to be deployed and independent from the force exerted by the cargo pallet 8, a blocking device 58 is present. The blocking device 58 comprises a blocking element 60, which in FIG. 1 is moved into blocking position, in which the pin 54 is contacted, while placed on the first guide surface 50. Irrespective of the force exerted by the cargo pallet 8, the restraining device 10 cannot move and the cargo pallet 8 remains locked. In case the force acts in negative X-direction the end stop 45 blocks the rotation of the restraining device 10 in a counter clockwise direction.

The whole illustration of FIG. 1 is shown in a first operation mode, which releases the cargo pallet 8 once it exerts a predetermined force onto the restraining device 10, e.g. by a deployment parachute. If another operation mode, i.e. a gravity drop and combat offload is desired, cam 48 may be moved by means of the actuator 62 in the drawing plane to the right. Hence, the required force for releasing the cargo pallet 8 will be very low, such that it suffices to increase the angle of attack of the aircraft by conducting a steep climb and to open the cargo door at the rear of the aircraft. Exemplarily, in FIG. 1 also a motor 64, e.g. an electric motor, coupled to the actuator 62, is shown for driving the actuator 62 for moving the cam 48.

Altogether, the lock according to the invention as shown in FIG. 1 has a plurality of advantages compared to common locks. First of all, the position of the bell crank 22 can be maintained throughout a force interval, which is below a predetermined extraction force. The cam 48 with its relatively flat first guide surface 50 prevents swiveling or tilting of the bell crank 22 when it is not yet desired. Secondly, the movable contacting head 14, which is swivably mounted around a contacting head joint 16, allows to always maintain a surface contact between the cargo pallet 8 and the force introduction region 12 of the restraining device 10, which makes the force introduction harmonic and even and very predictable.

In the following, FIGS. 2A to 2J show an extraction process in subsequent views. These are explained in the following.

Figure 2A:
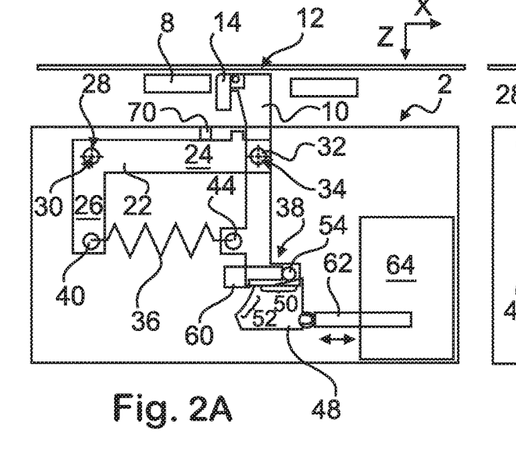
FIG. 2A to 2J show a common extraction process in subsequent views.

In FIG. 2A, the lock 2 is logistically locked. The blocking element 60 is in contact with the pin 54, such that the restraining device 10 cannot be moved. Hence, the illustration of FIG. 2A is substantially the same as in FIG. 1. For the sake of better understanding and compacting the illustrations, some reference numerals shown in FIG. 1 are neglected.

Figure 2B:
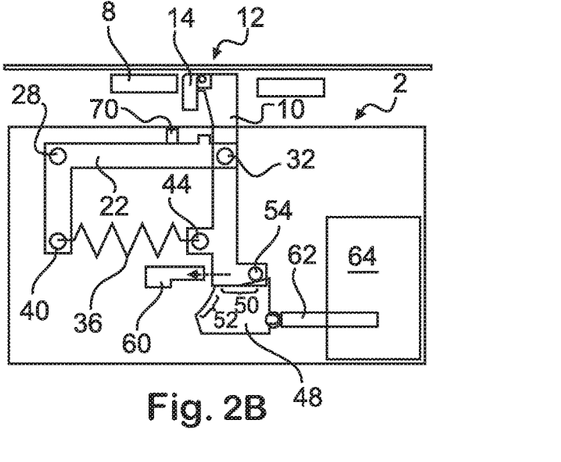

In FIG. 2B, the blocking element 60 is moved away from the pin 54, such that it is able to run on the first guide surface 50. All other components remain as before.

Figure 2C:
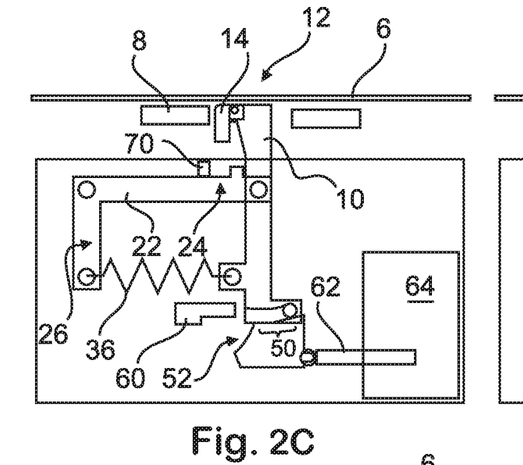

In FIG. 2C, the motion of the blocking element 60 is stopped, the parachute (not shown) may be deployed and the pallet 8 may start to move to the contacting head 14.

Figure 2D:
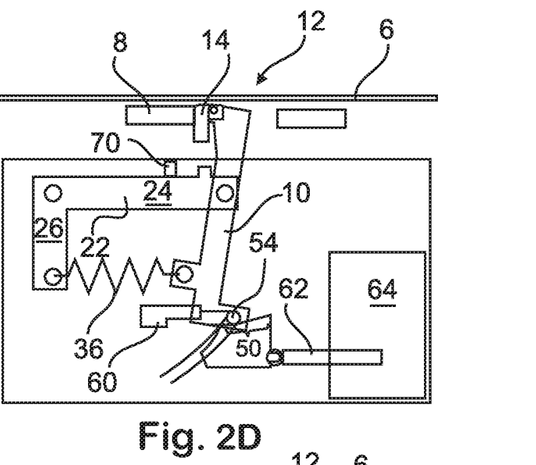

In FIG. 2D, the cargo pallet 8 has contacted the contacting head 14, which remains parallel to the outer surface 20 of the pallet 8 thanks to the contacting head joint 16. Due to the force exerted by the deployment parachute (not shown), the pallet 8 pushes the engagement end 12 in an x-direction, such that the pin 54 runs along the first guide surface 50. Due to the first mean slope, the bell crank 22 remains in the same position and orientation.

Figure 2E:
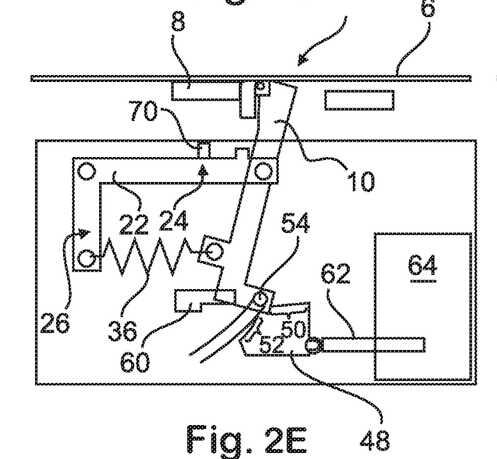

In FIG. 2E it is shown that the force exerted by the cargo pallet 8 acting on the engagement end 12 of the restraining device 10 has reached a predetermined value, which is supposed to release the lock 2. In this state, the pin 54 reaches a junction between the first section 50 and the second guide surface 52, such that the pin 54 is about to run on the second surface 52. In this state, the bell crank 22 just remains in its momentary orientation.

Figure 2F:
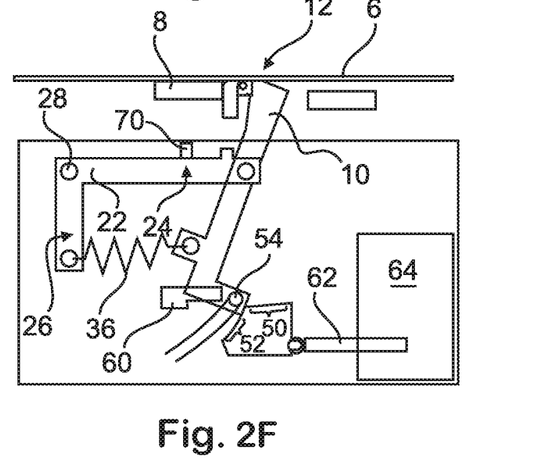

In FIG. 2F, the pin 54 just leaves the first guide surface 50 and is about to let the bell crank 22 freely rotate around the bell crank joint 28.

Figure 2G:
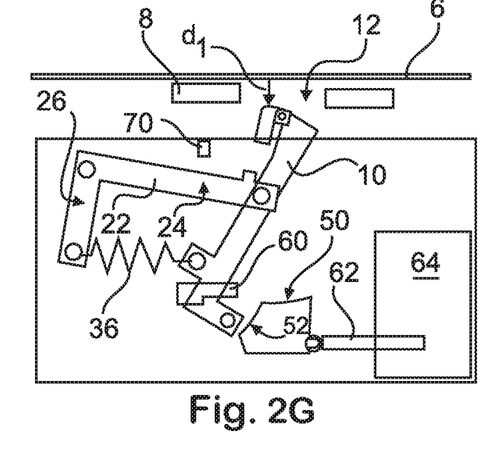
Figure 2H:
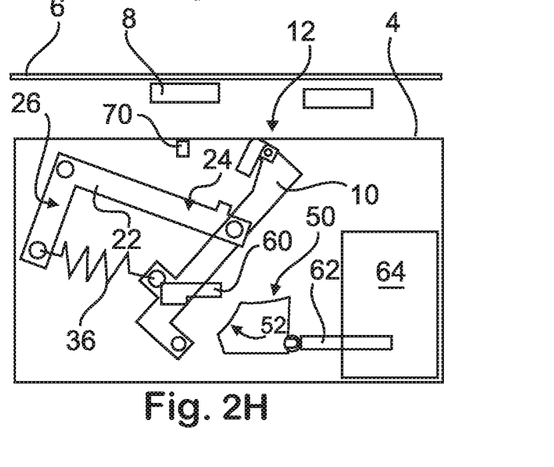
Figure 2I:
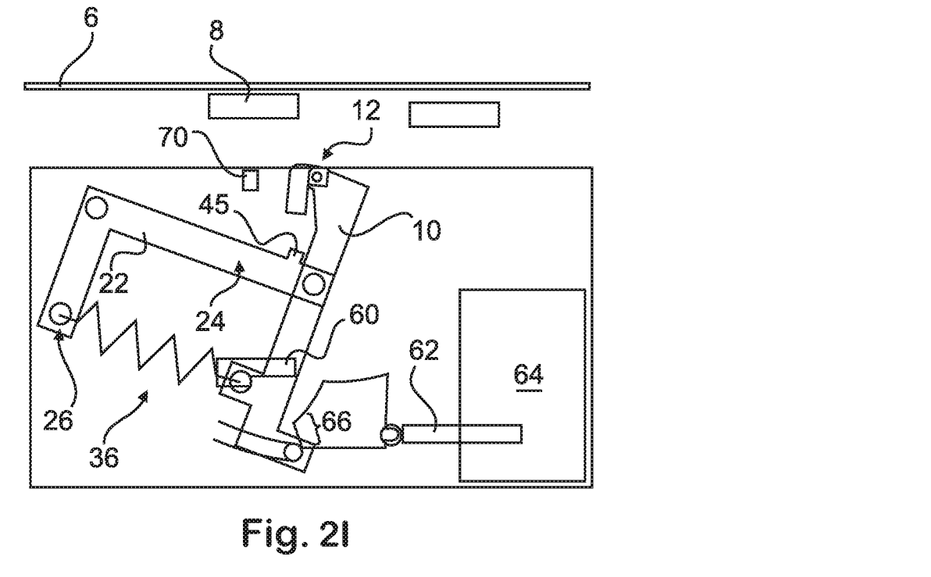

This is initiated in FIG. 2G, where the bell crank 22 has rotated about approximately 10° from its previous orientation. This leads to the engagement end 12 moving in a downwards direction about a distance dl, which increases until the engagement end 12 completely dips into the housing 4. Since the force that exerts on the spring 36 is stopped due to the engagement end leaving the surface contact with the cargo pallet 8, the spring 36 expands again. This is shown in FIG. 2I.

Figure 2J:
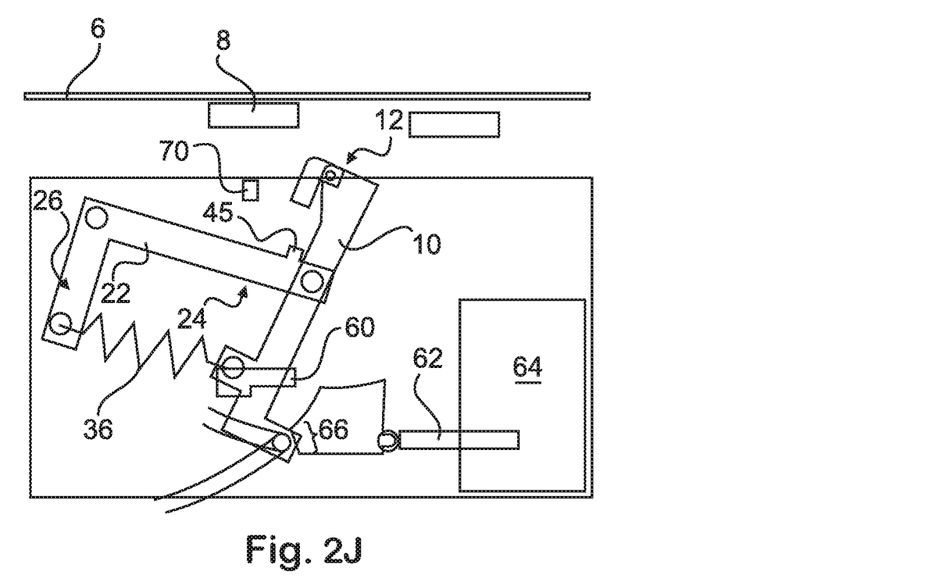

In FIG. 2J, the pin 54 is in contact with a third guide surface 66 and holds the restraining device 10 there.

In the following FIGS. 3A to 3D, another operating state is shown, which is known as gravity drop or combat offloading.

Figure 3A:
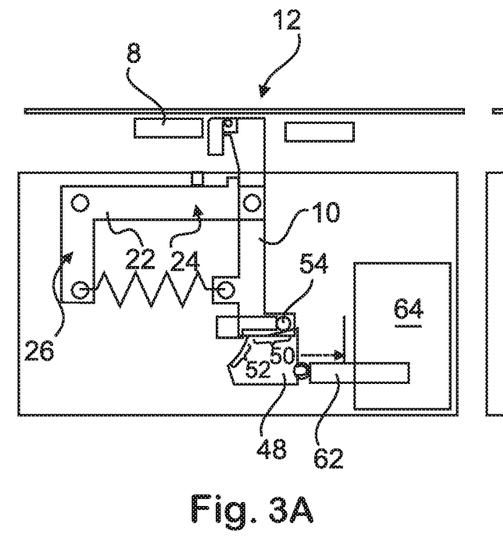
FIGS. 3A to 3D show a gravity drop extraction sequence.

In a first step, which is shown in FIG. 3A, the cam 48 is moved to the right-hand side by means of the actuator 62. The goal is to move the cam 48 about such a distance, that the pin 54 does not rest on the first guide surface 50, but may immediately slide along the second guide surface 52.

Figure 3B:
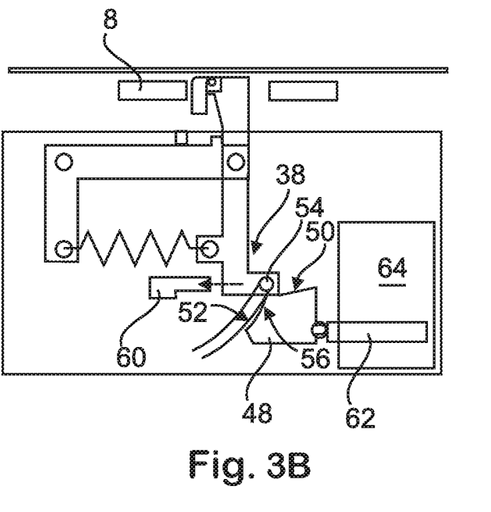

The end position of the cam 48 is shown in FIG. 3B, where the pin 54 is positioned above the junction 56 between the first guide surface 50 and the second guide surface 52. Further, for allowing the deployment, the latching unit 46 is released by moving the blocking element 60 to the left-hand side, such that the pin 54 is released.

Figure 3C:
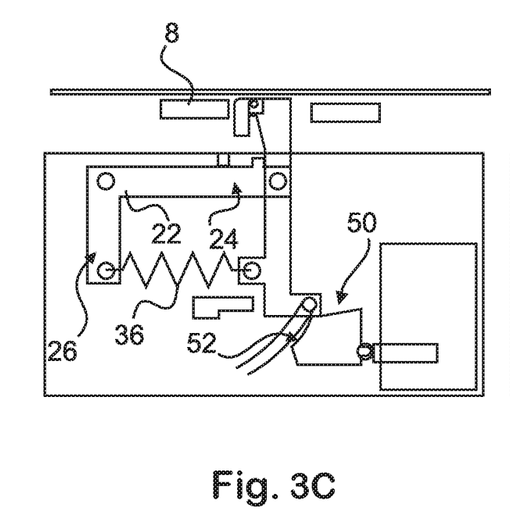

FIG. 3C shows the lock 2 in a state, which allows to deploy the cargo pallet 8 with a minimum required force provided through gravity.

Figure 3D:
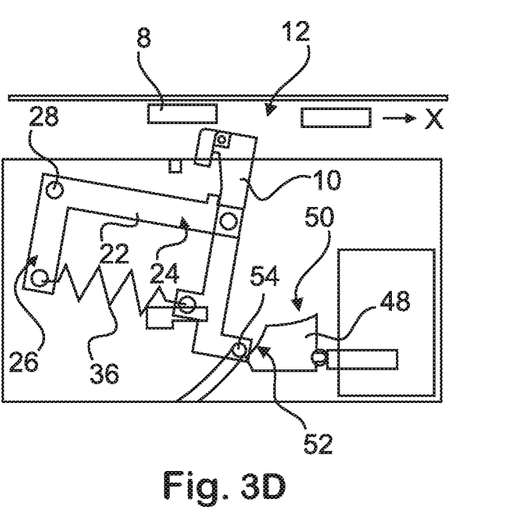

In FIG. 3D, the deployment process is conducted. It can be seen, that cargo pallet 8 is moved in the x-direction, thereby exerting a force onto the engagement end 12 of restraining device 10, which immediately is swiveled around the bell crank joint 28 with a substantially uncompressed spring 36 with the pin 54 sliding down the second guide surface 52 of cam 48. Since the pin 54 does not have to slide on the first guide surface 50, the bell crank 22 can swivel around the bell crank joint 28 and the spring 36 is substantially not subjected to any compressing force. Hence, the cargo pallet 8 is basically not subjected to any mechanical resistance.

Figure 4:
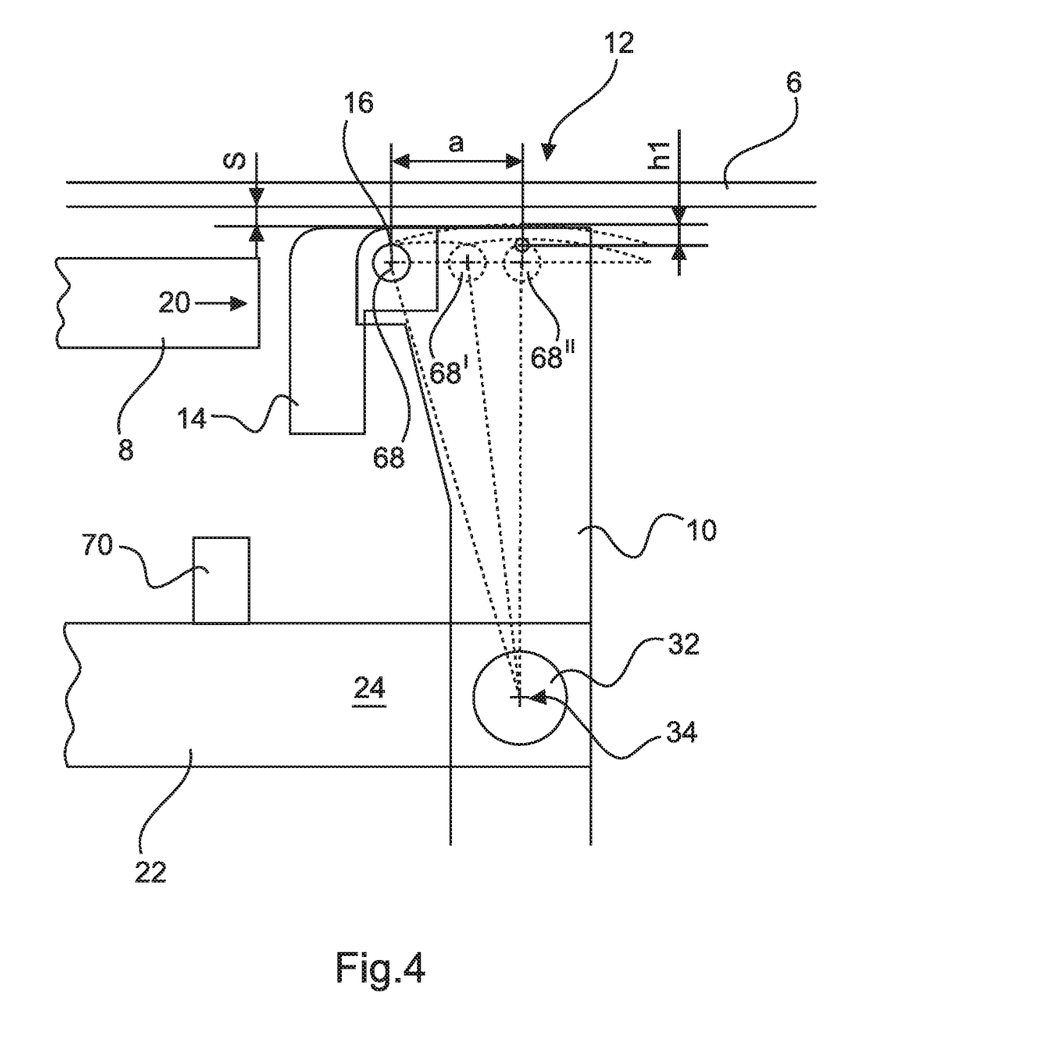
FIG. 4 shows the engagement end of the restraining device in a detail view.

FIG. 4 shows a detail view onto the engagement end 12 of the restraining device 10. First of all, the contacting head joint 16 may be a spherical joint having a contacting head joint axis 68. The position of the contacting head joint axis 68 may be chosen in a way that the contacting head 14 conducts a certain change in vertical position (indicated with S) when the restraining device 10 moves around the restraining device joint axis 34. It is desired that the contacting head 14 slightly move upward when the cargo pallet 8 moves in an x-direction. If the contacting head axis 68 was located directly above the restraining device axis 34 in a neutral state, a gap to the rails 6 would only be increased during the motion of the restraining device 10. Hence, by placing the contacting head axis 68 further against the x-direction, moving the cargo pallet 8 even improves the restraining function by slightly decreasing the gap to the rails 6 and improving the contact between engagement end 12 and the cargo pallet 8. The Z-position of the axis 16 may be chosen according to the pallet cross section, such that it is located between the upper and the lower edge of the pallet 8. If this is not the case, the pallet would rotate the head 14 and the edge 20 would not be parallel to the head 14 anymore. The desired surface contact would degrade to a line or even a point contact.

Realizing the contacting head joint 16 as a spherical joint is preferred when the contacting head axis 68 and the restraining device axis 34 are not parallel. This may be the case in aircraft of the type A400M. This avoids constraint forces and potential canting effects. When using a spherical bearing, it may be feasible to provide a mechanical stop for the contacting head 14 to prevent its rotation around the x-axis. However, the contacting head 14 may also be shaped in a rotational symmetrical fashion, such that a rotation around the x-axis does not have any effect.

As indicated above, it is desired to let the gap between the contacting head 14 and the rails 6 decrease during a first section of the motion of the cargo pallet 8. Dashed lines indicate other possible positions for a contacting head axis 68' and 68", with the contacting head joint 68' leading to a lesser effect of decreasing the gap size and with the contacting head joint 68" not reducing the gap size at all.

A mechanical stop 70, which limits the motion of the first leg 24 of the bell crank 22 in an upper, vertical direction is provided. The position of the mechanical stop 70 may be adjustable. Further, the vertical position of the cam 48 may be adjustable as well. Altogether, this allows to adjust the whole lock to tolerate a certain mechanical play. The play is also compensated by the movement of the contacting head 14 in a vertical, upward direction, which is indicated with the dimension h1.

FIGS. 5A to 5D show another exemplary embodiment of a lock 72 with a slightly different setup. Here, a restraining device 74 is present, having an engagement end 76 with a contacting head 78 swivably mounted by means of a contacting head joint 80. A first guide means 82 comprises a crescent-shaped slotted gate having two walls 84 that enclose an exit slot 86 which should be shaped suitable to the cam device 48. The opening of the exit slot 86 should be wide enough, so that the restraining device 74 may rotate back up even when the device 74 is in a 90 degree angle to the bell crank 22, e.g. after a gravity drop. A second guide means 88 in the form of an elongate nose piece is provided, having a longitudinal protrusion with a width adapted to the slot 86. The second guide means 88 is fixedly arranged on the restraining device 74. This may be in a restraining device joint axis 90. The first guide means 82 is fixedly arranged in the housing concentrically to the second guide means 88, such that it is received therein. Further, the first guide means 82 and the second guide means 88 are arranged concentrically to the restraining device joint axis 90. The guide means 82, which is fixed to the housing 4, has the ability to be rotated around the restraining device joint axis 90 to select the different modes of operation (extraction drop, gravity drop/combat offloading). This rotation may be coupled to a mode selector, that is not shown in detail for this embodiment of the invention.

From the drawings, it is apparent that the second guide means 88 may only pass through the slot 86 in a certain angular orientation of the second guide means 88, i.e. of the bell crank 22. Hence, when the restraining device 74 receives a force from the cargo pallet 8 it will rotate around the restraining device joint axis 90, until the orientation of the second guide means 88 matches the position of the slot 86 of the first guide means 82. Then, the restraining device 74 may initiate a motion of the bell crank 22.

Figure 5A:
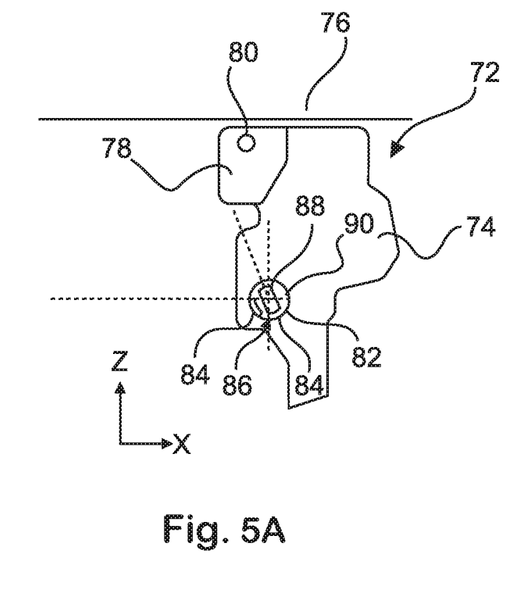
FIGS. 5A to 5D show another exemplary embodiment of a lock.

In FIG. 5A, an armed position of the lock 72 is shown. Here, the second guide means 88 is in a surface contact with the right wall 84 of the first guide means 82, such that the second guide means 88 cannot be moved in a vertical direction.

Figure 5B:
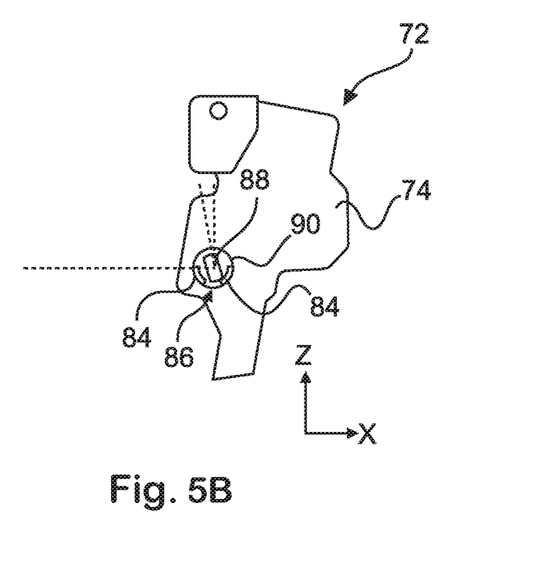

In FIG. 5B, the restraining device 74 is already rotated about the restraining device joint axis 90 and almost reaches the slot 86, i.e. it is almost released.

Figures 5C, 5D:
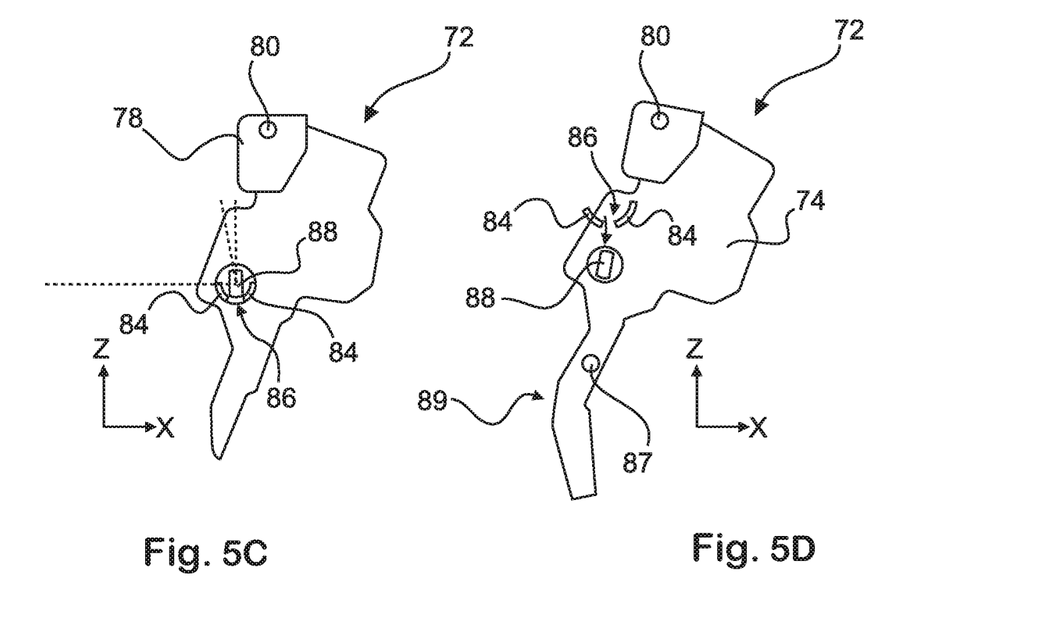

In FIG. 5C, the orientation of the second guide means 88 and the slot 86 match, such that it passes through the slot 86.

This is shown in FIG. 5D, where the restraining device 74 has conducted a clear vertical motion on the spring 36 expanding again. In this illustration, a force reaction end 89 with a joint 87 for receiving the force introduction device 36 is shown for the sake of completeness.

Figure 6:
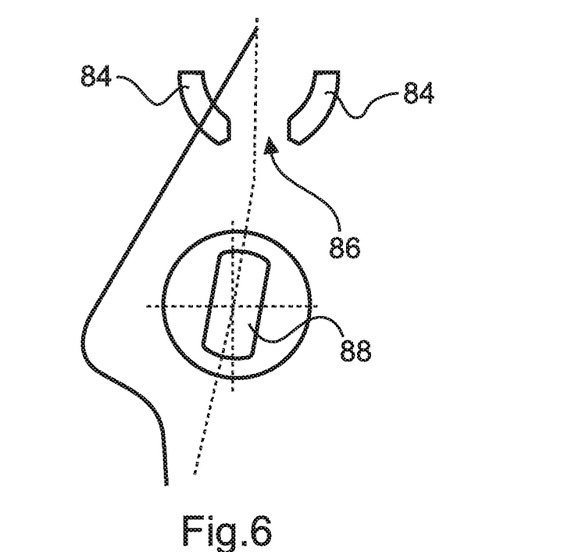
FIG. 6 shows a further detail of the first guide means and the second guide means.

FIG. 6 shows a further detail of the first guide means 82 and the second guide means 88. By rounding the edges of the walls 84 as well as of the nose body 88 the nose body 88 may easily slip through the exit slot 86.

Figure 7:
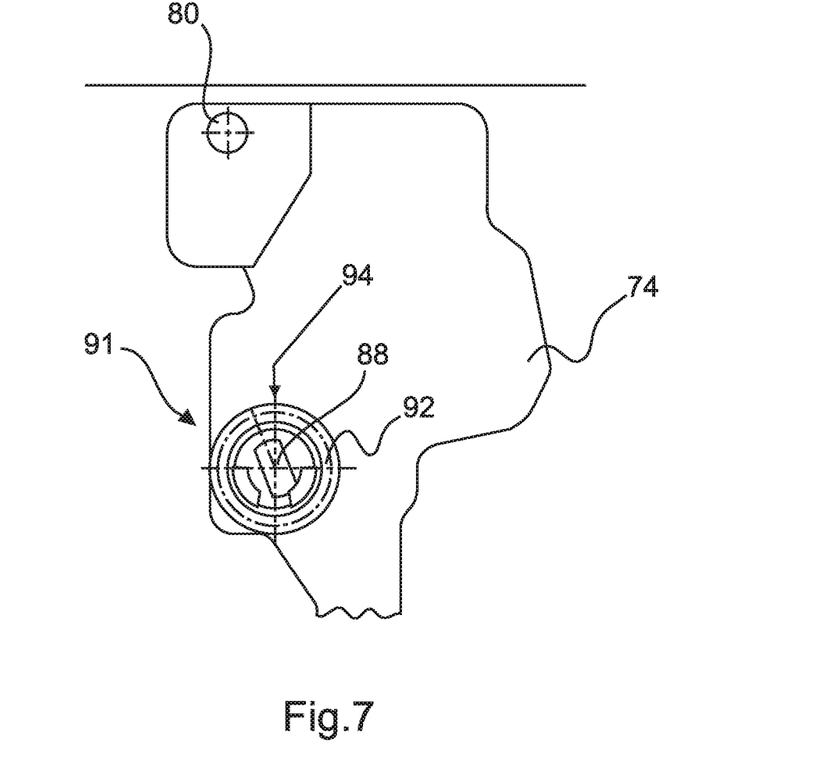
FIG. 7 shows a modification of the lock shown in FIGS. 5A to 5D.

FIG. 7 shows a still further variant having a rotatably supported second guide means 88 attached to a self-locking gear arrangement 91 having a gear wheel 92, which is rotatable through a second gear wheel 94, which is not shown in detail. For example, the first and second gears are realized as a worm gear, which is self-locking. Through rotating the second gear wheel 94, e.g. by means of a screwdriver, the orientation of the second guide means 88 relative to the restraining device 74 is adjustable. Hence, the release force may be adjusted.

As the surface pressure between the first guide means 82 and the second guide means 88 may be particularly high, it is feasible to harden the materials used or make a second set of devices on the other side of the lock.

Figure 8:
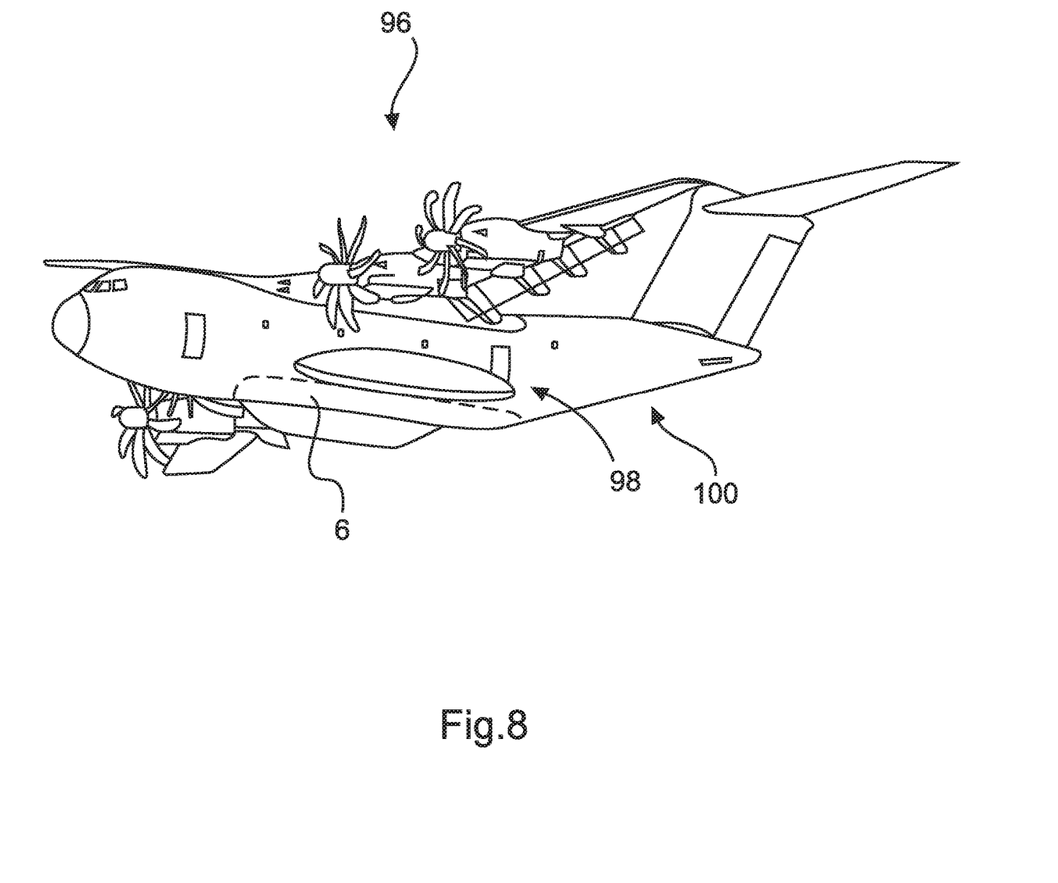
FIG. 8 shows an aircraft with a cargo compartment and air delivery locks installed on a cargo compartment floor located therein.

Finally, FIG. 8 shows an aircraft 96 having a cargo compartment 98 and a cargo door 100. The cargo compartment 98 may comprise the cargo compartment floor 6, which is equipped with a plurality of air delivery locks 2 according to the above description as well as additional means on the floor 6 required for enabling the air delivery such as guide rails (not depicted).

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. Air delivery lock for a cargo pallet located in an aircraft, comprising:
   a housing;
   a restraining device having an engagement end for contacting and restraining the cargo pallet, and a force reaction end;
   a bell crank having a bell crank joint for swivably mounting the bell crank;
   an elastically deformable force introduction unit; and
   a latching unit;
   wherein the restraining device is swivably mounted on a first leg of the bell crank around a restraining device axis;
   wherein the force introduction unit is attached to a second leg of the bell crank and the force reaction end of the restraining device;
   wherein the latching unit comprises a first guide means and a second guide means;
   wherein the first guide means is attached to a structurally fixed point of the housing and the second guide means is attached to the restraining device;

wherein the first guide means, the second guide means, the restraining device, the bell crank and the force introduction unit are designed that the first guide means allows a rotation of the restraining device around the restraining device axis, thereby deforming the force introduction unit, and prevents a rotation of the bell crank by limiting the motion of the second guide means, if the force acting on the engagement end is below a predetermined release force, and that the first guide means releases the second guide means if the force acting on the engagement end equals or exceeds the predetermined release force, thereby allowing the bell crank to rotate.

2. The air delivery lock according to claim 1, wherein the first leg of the bell crank is arranged largely parallel to the deployment direction in a neutral state of the lock.

3. The air delivery lock according to claim 1, further comprising an upper stop arranged above the first leg of the bell crank for limiting a vertical movability of the first leg of the bell crank in an upwards direction.

4. The air delivery lock according to claim 1, further comprising a contacting head swivably mounted on the engagement end, the contacting head having a contacting surface capable for providing a surface contact with the cargo pallet to be deployed.

5. The air delivery lock according to claim 4, wherein the contacting head is swivably mounted by means of a spherical joint.

6. The air delivery lock according to claim 1,
wherein the first guide means is a cam device;
wherein the second guide means is a pin;
wherein the first guide means has an outer cam surface facing to the bell crank joint, the outer cam surface having a first guide surface with a first mean slope and a second guide surface with a second mean slope, the first guide surface and the second guide surface being connected to each other; and
wherein the first guide means and the second guide means are designed that the pin slides on the first guide surface, thereby deforming the force introduction unit, and prevents the rotation of the bell crank, if the force acting on the engagement end is below the predetermined release force, and that the pin slides on the second guide surface, thereby allowing the bell crank to rotate about the bell crank axis, if the force acting on the engagement end equals or exceeds the predetermined release force.

7. The air delivery lock according to claim 6, wherein the position of the cam device is selectively adjustable along the deployment direction such that the pin is situated above the second guide surface.

8. The air delivery lock according claim 1,
wherein the first guide means is a slotted gate device having a circular receiving space at least partially surrounded by at least one wall, the at least one wall forming an exit slot,
wherein the second guide means is a nose piece having a width adapted to the exit slot of the first guide means,
wherein the first guide means and the second guide means are arranged concentrically to the restraining device joint axis, and
wherein the first guide means and the second guide means are designed that the second guide means exits the first guide means through the exit slot if the force acting on the engagement end of the restraining device reaches or exceeds the predetermined release force.

9. The air delivery lock according to claim 8, wherein the first guide means is crescent-shaped and the exit slot is symmetrically arranged in the first guide means.

10. The air delivery lock according to claim 8, wherein the first guide means is adjustable in its rotational position through a self-locking gear arrangement.

11. An air delivery system, comprising:
at least a pair of parallel guide rails for carrying cargo pallets, which guide rails are extendable along a longitudinal axis of an aircraft; and
at least one air delivery lock, the air delivery lock comprising:
a housing;
a restraining device having an engagement end for contacting and restraining the cargo pallet, and a force reaction end;
a bell crank having a bell crank joint for swivably mounting the bell crank;
an elastically deformable force introduction unit; and
a latching unit;
wherein the restraining device is swivably mounted on a first leg of the bell crank around a restraining device axis;
wherein the force introduction unit is attached to a second leg of the bell crank and the force reaction end of the restraining device;
wherein the latching unit comprises a first guide means and a second guide means;
wherein the first guide means is attached to a structurally fixed point of the housing and the second guide means is attached to the restraining device;
wherein the first guide means, the second guide means, the restraining device, the bell crank and the force introduction unit are designed that the first guide means allows a rotation of the restraining device around the restraining device axis, thereby deforming the force introduction unit, and prevents a rotation of the bell crank by limiting the motion of the second guide means, if the force acting on the engagement end is below a predetermined release force, and that the first guide means releases the second guide means if the force acting on the engagement end equals or exceeds the predetermined release force, thereby allowing the bell crank to rotate.

12. The air delivery system according to claim 11, wherein:
the first guide means is a cam device;
the second guide means is a pin;
the first guide means has an outer cam surface facing to the bell crank joint, the outer cam surface having a first guide surface with a first mean slope and a second guide surface with a second mean slope, the first guide surface and the second guide surface being connected to each other;
the first guide means and the second guide means are designed that the pin slides on the first guide surface, thereby deforming the force introduction unit, and prevents the rotation of the bell crank, if the force acting on the engagement end is below the predetermined release force, and that the pin slides on the second guide surface, thereby allowing the bell crank to rotate about the bell crank axis, if the force acting on the engagement end equals or exceeds the predetermined release force; and
the position of the cam device is selectively adjustable along the deployment direction such that the pin is situated above the second guide surface.

13. An aircraft having at least one cargo compartment and comprising at least one air delivery system according to claim 11.

\* \* \* \* \*